2,976,326
         Patented Mar. 21, 1961

2,976,326

PROCESS FOR THE MANUFACTURE OF VINYL THIOETHERS

Elmar K. Wilip, Cambridge, Mass., assignor to W. R. Grace & Co., Cambridge, Mass., a corporation of Connecticut No Drawing. Filed Dec. 11, 1959, Ser. No. 858,851

4 Claims. (Cl. 260—609)

This invention relates to the manufacture of vinyl thioethers having the general formula $RSCH=CH_2$.

Vinyl thioethers, also referred to as vinyl sulfides, have been manufactured in the past by the reaction of acetylene with mercaptans at elevated temperatures and in the presence of catalysts, either basic metal compounds or salts of zinc or cadmium, as described in the patent to Reppe et al., No. 2,081,766. Depending on the operating conditions and the catalyst used, the end product of the Reppe process may be the vinyl thioether, or another molecule of mercaptan may add to the vinyl thioether first formed, giving an ethane dithiole ether of the general formula $RSCH_2CH_2SR$. Under some conditions, a mixture of the two compounds is formed. The addition reaction may be represented by the following equation:

$$RSCH=CH_2 + HSR \rightarrow RSCH_2CH_2SR \qquad (1)$$

The difficulty of obtaining consistently high yields of vinyl thioethers by the Reppe process is well recognized, as evidenced by the statement which appears on page 635 of "Vinyl and Related Polymers" by C. E. Schildknecht, published in 1952 by John Wiley & Sons, Inc: "Alkyl vinyl sulfides are not obtained in good yield by reaction of acetylene with the mercaptans because of the readiness with which the vinyl thioether first formed undergoes further reaction with mercaptan."

An object of my invention therefore, is the development of a process for making vinyl thioethers in good yields and in a high state of purity. More specifically, my invention has for its object a process for making vinyl thioethers in which the above-described secondary reaction between the thioether and mercaptan does not take place. A further object of my invention is to provide a process which may be carried out at room temperature or below, thus eliminating the necessity of using the elevated temperatures of the Reppe process, which in themselves may cause decomposition and loss of the desired vinyl thioether product.

I have discovered that mercaptans may be caused to react under certain conditions with vinyl esters, as for example vinyl acetate, to give vinyl thioethers in excellent yield. I have found that at low temperatures, i.e. at —10° C. and preferably as low as —20° C. and in the presence of a suitable catalyst such as mercuric sulfate, a vinyl interchange reaction takes place between mercaptans and vinyl esters, and that under these conditions there is no tendency for further reaction between the vinyl thioether formed and the mercaptan.

My invention will be further understood by reference to the following examples.

Example I 1032 grams (12 moles) of vinyl acetate was mixed with 1.2 grams of mercuric acetate and 0.2 grams of copper resinate (polymerization inhibitor), after which 0.3 ml. of concentrated sulfuric acid was added. The mixture was cooled to —20° C., 202 grams (1 mole) of lauryl mercaptan was added and the reaction mixture was held at —20° C. for 3 hours.

The catalyst was neutralized by the addition of 5 grams of sodium acetate trihydrate, the excess of vinyl acetate and the acetic acid formed during the reaction were distilled off and the raw product was washed with sodium bicarbonate solution and water and dried with magnesium sulfate. 180 grams of vinyl lauryl thioether having a boiling point of 105–110° C. (0.3 mm.), or 80% of the theoretical yield, was recovered by flash distillation.

The calculated percentage composition for vinyl lauryl thioether, $CH_2=CHSC_{12}H_{25}$, is C=73.65%, H=12.35%, S=14.04%. On analysis of the product, the following values were found: C=72.8%, H=13.0%, S=14.0%. Spectroscopic examination confirmed the fact that the material produced was vinyl lauryl thioether of a high degree of purity.

Example II

A mixture of 1032 grams (12 moles) of vinyl acetate, 1.2 grams of mercuric acetate, 0.2 gram of copper resinate and 0.3 ml. of concentrated sulfuric acid was cooled to —20° C. 90 grams (1 mole) of n-butyl mercaptan was added and the mixture was allowed to stand for 18 hours at —20° C., after which the process of Example I was followed.

A yield of 90 grams of vinyl n-butyl thioether having a boiling point of 55–60° C. (20 mm.), was recovered by vacuum distillation. Analysis of the product by bromine titration confirmed the fact that vinyl n-butyl thioether, $CH_2=CHSC_4H_9$, of about 99% purity had been obtained.

Example III

A mixture of 1032 grams (12 moles) of vinyl acetate, 1.2 grams of mercuric acetate, 0.2 gram of copper resinate and 0.3 ml. of concentrated sulfuric acid was cooled to —20° C. 100 grams (1 mole) of thiophenol was added, the mixture was allowed to stand at —20° C. for 24 hours, and the product was recovered by following the process of Example I.

Analysis of the product by bromine titration confirmed the fact that vinyl phenyl thioether, $CH_2=CHSC_6H_5$ had been obtained in about an 89% yield.

The vinyl interchange reaction between the mercaptans and the vinyl acetate of the above examples may be represented by the following equation:

$$RSH + CH_3COOCH=CH_2 \xrightarrow[\text{catalyst}]{-20°\text{ C.}} RSCH=CH_2 + CH_3COOH \qquad (2)$$

This reaction proceeds to a high degree of completion under the specified reaction conditions, with excellent yields of vinyl thioether. Although further reaction between the vinyl thioether and mercaptan might be expected to take place, as it does in the Reppe process, no tendency toward such a reaction has been observed.

The fact that mercaptans react with vinyl esters in a vinyl interchange reaction at low temperatures is also unexpected in view of the addition reaction which takes place between mercaptans and vinyl esters at room temperature, with the formation of 2-alkylmercapto ethyl esters, as shown in the following equation:

$$RSH + CH_3COOCH=CH_2 \xrightarrow[\text{catalyst}]{\text{room temp.}} CH_3COOCH_2CH_2SR \qquad (3)$$
$$\text{2-alkylmercapto ethyl acetate}$$

My improved process is based on the discovery that under the specific conditions shown, mercaptans undergo neither of the usual and expected reactions represented by Equations 1 and 3, but rather the vinyl interchange reaction of Equation 2. This reaction, furthermore, is not limited to the specific mercaptans shown in the examples, but may be carried out with any desired mercaptan, for example methyl mercaptan, ethyl mercaptan, n-propyl mercaptan, isopropyl mercaptan, hexyl mercaptan, octodecyl mercaptan, tolyl mercaptan, benzyl mercaptan etc.

Instead of the mercuric sulfate used as a catalyst in the above examples, I may use the mercury, zinc or cadmium salt of any of the strong acids, for example sulfuric, phosphoric, silicotungstic or hydrochloric acid. Additionally, other vinyl esters, as for example vinyl formate or vinyl propionate, may be used in place of the vinyl acetate.

I claim:

1. The method of making vinyl lauryl thioether which includes the steps of reacting lauryl mercaptan with vinyl acetate at a temperature of −20° C. in the presence of a catalytic amount of mercuric sulfate.

2. The method of making vinyl n-butyl thioether which includes the steps of reacting n-butyl mercaptan with vinyl acetate at a temperature of −20° C. in the presence of a catalytic amount of mercuric sulfate.

3. The method of making vinyl phenyl thioether which includes the steps of reacting phenyl mercaptan with vinyl acetate at a temperature of −20° C. in the presence of a catalytic amount of mercuric sulfate.

4. The method of making a vinyl thioether which includes the steps of reacting a mercaptan with a vinyl ester selected from the group consisting of vinyl acetate, vinyl formate and vinyl propionate at a temperature of about −10° C. to −20° C. in the presence of a catalyst selected from the group consisting of mercury, zinc and cadmium salts of strong acids.

No references cited.